United States Patent [19]
Erickson et al.

[11] Patent Number: 5,459,624
[45] Date of Patent: Oct. 17, 1995

[54] ACTIVATOR CONTROL METHOD AND APPARATUS FOR POSITIONING A TRANSDUCER USING A PHASE PLANE TRAJECTORY TROUGH FUNCTION FOR A DIRECT ACCESS STORAGE DEVICE WITH ESTIMATED VELOCITY AND POSITION STATES

[75] Inventors: Kevin J. Erickson, Rochester, Minn.; Alexei H. Sacks, Faifax, Va.

[73] Assignee: International Business Machines Corporation, Armonk, N.Y.

[21] Appl. No.: 143,561

[22] Filed: Oct. 26, 1993

[51] Int. Cl.[6] .................................................. G11B 5/596
[52] U.S. Cl. ..................................... 360/77.02; 360/78.12
[58] Field of Search ........................... 360/75, 77.01, 360/77.02, 77.05, 78.09, 114, 78.14, 78.07, 78.12, 78.06, 73.11, 73.06, 73.08, 73.02; 318/599

[56] References Cited

U.S. PATENT DOCUMENTS

| | | | |
|---|---|---|---|
| 4,133,011 | 1/1979 | Kurzweil, Jr. | 360/78.09 |
| 4,575,776 | 3/1986 | Stephens et al. | 360/78.09 |
| 4,679,103 | 7/1987 | Workman | 360/78.07 |
| 4,743,821 | 5/1988 | Hall | 318/599 |
| 4,894,599 | 1/1990 | Ottesen et al. | 360/77.05 X |
| 4,962,492 | 10/1990 | Mathildus et al. | 360/114 X |
| 5,111,440 | 5/1992 | Mathildus et al. | 360/114 X |
| 5,182,684 | 1/1993 | Thomas et al. | 360/78.09 |
| 5,189,571 | 2/1993 | Murphy et al. | 360/75 |
| 5,268,800 | 12/1993 | Nielsen | 360/77.01 |
| 5,291,110 | 3/1994 | Andrews et al. | 360/75 X |

OTHER PUBLICATIONS

Anderson et al., "Sliding Mode Control for Arrival and Small Movement", Sep. 1990, pp. 377–381, vol. 33, No. 4.
Palmer, R. S., "Fast Eigenvector Control of a Disk File Actuator", Apr. 1980, pp. 5069–5075, vol. 22, No. 11.

Primary Examiner—Aristotelis Psitos
Assistant Examiner—Patrick Wamsley
Attorney, Agent, or Firm—Joan Pennington

[57] ABSTRACT

A phase plane trajectory trough method and apparatus for fast settling of a data transducer for positioning a transducer head over a selected track on a disk surface are provided for use in a disk file. The disk file includes at least one disk mounted for rotation about an axis and the disk has at least one disk surface including a plurality of data tracks for storing data. An actuator moves the transducer head from one track location to another track location. A controller is coupled to the actuator for applying a gain control signal to control movement of the actuator. A phase plane trajectory trough function is defined for the disk file. Velocity and position states of the actuator are estimated and compared with the phase plane trajectory trough function for generating a base correction factor. The controller is responsive to both the estimated velocity and position states and the phase plane trajectory trough (PPTT) function for modifying the gain control signal.

8 Claims, 5 Drawing Sheets

ACTIVATOR CONTROL METHOD AND APPARATUS FOR POSITIONING A TRANSDUCER USING A PHASE PLANE TRAJECTORY TROUGH FUNCTION FOR A DIRECT ACCESS STORAGE DEVICE WITH ESTIMATED VELOCITY AND POSITION STATES

BACKGROUND OF THE INVENTION

1. Field of the Invention

The present invention relates generally to an actuator positioning system in a direct access storage device (DASD) and more particularly to a phase plane trajectory trough method and apparatus for fast settling of a data transducer in a disk file.

2. Description of the Prior Art

Computers often include auxiliary memory storage units having media on which data can be written and from which data can be read for later use. Disk drive units incorporating stacked, commonly rotated rigid magnetic disks are used for storage of data in magnetic form on the disk surfaces. Data are recorded in concentric, radially spaced data information tracks arrayed on the surfaces of the disks. Transducer heads driven in a path toward and away from the drive axis write data to the disks and read data from the disks.

All DASD units must have a method to position each data head over the proper radial location to write a track and again, to position it very close to the same location to read the track. With the higher-level files using a voice coil type of actuator, a feedback mechanism must be provided to locate and stably hold the head on a given track.

Historically in actuator control systems, the settle process that occurs during an access operation has been a very difficult process for an actuator servo system to control with reasonable consistency. This difficulty can be caused by many things that introduce variability into the settle process. For example, temperature can affect changes in many system parameters, such as, actuator torque constant, actuator bearing stiffness, actuator material stiffness and actuator flex cable bias. Actuator flex cable bias differences occur at various actuator locations. Nonlinearities occur in actuator bearings and flex cable spring constants. Access distance and external forces, such as windage and vibration, introduce variability into the settle process.

The settle process that occurs during an access operation in an actuator control system has a direct effect on the overall access performance of that system. If the actuator control system has difficulties in settling the actuator to the desired position, then the time required to perform a complete access operation increases, which can result in undesirable throughput performance.

Traditional actuator control methods typically use proportional-integral-derivative (PID) controllers to move an actuator to a desired position. However, PID controllers inherently exhibit a slow response when designed to minimize overshoot, or the PID controllers exhibit overshoot when designed to provide for a fast response. The conventional PID controller cannot consistently provide both a fast response and minimal overshoot. Known actuator control methods consume a significant amount of microprocessor memory and time, which limits their use to fairly low sample rate systems.

A need exists for a method that can be used to improve the settle process in an actuator control system so that a faster and more consistent settle control action is achieved, and which also results in improved throughput performance. In addition, it is desirable that such a method does not require considerable microprocessor memory or instruction execution time to implement.

SUMMARY OF THE INVENTION

It is a principal object of the present invention to provide a phase plane trajectory trough method and apparatus for positioning transducer heads that consistently provides both a fast response and minimal overshoot in settling of the position of the transducer head over a selected track on a disk surface at the conclusion of a seek to that track and that overcomes many of the disadvantages of prior art arrangements.

In brief, the objects and advantages of the present invention are achieved by a phase plane trajectory trough method and apparatus for positioning a transducer head over a selected track on a disk surface in a disk file. The disk file includes at least one disk mounted for rotation about an axis and the disk has at least one disk surface including a plurality of data tracks for storing data. An actuator moves the transducer head from one track location to another track location. A controller is coupled to the actuator for applying a gain control signal to control movement of the actuator. A phase plane trajectory trough function is defined for the disk file. Velocity and position states of the actuator are estimated and compared with the phase plane trajectory trough function for generating a base correction factor. The controller is responsive to both the estimated velocity and position states and the phase plane trajectory trough (PPTT) function for modifying the gain control signal.

BRIEF DESCRIPTION OF THE DRAWING

The present invention, together with the above and other objects and advantages, can best be understood from the following detailed description of the embodiment of the invention illustrated in the drawing, wherein.

DETAILED DESCRIPTION OF THE PREFERRED EMBODIMENTS

Figure 1:
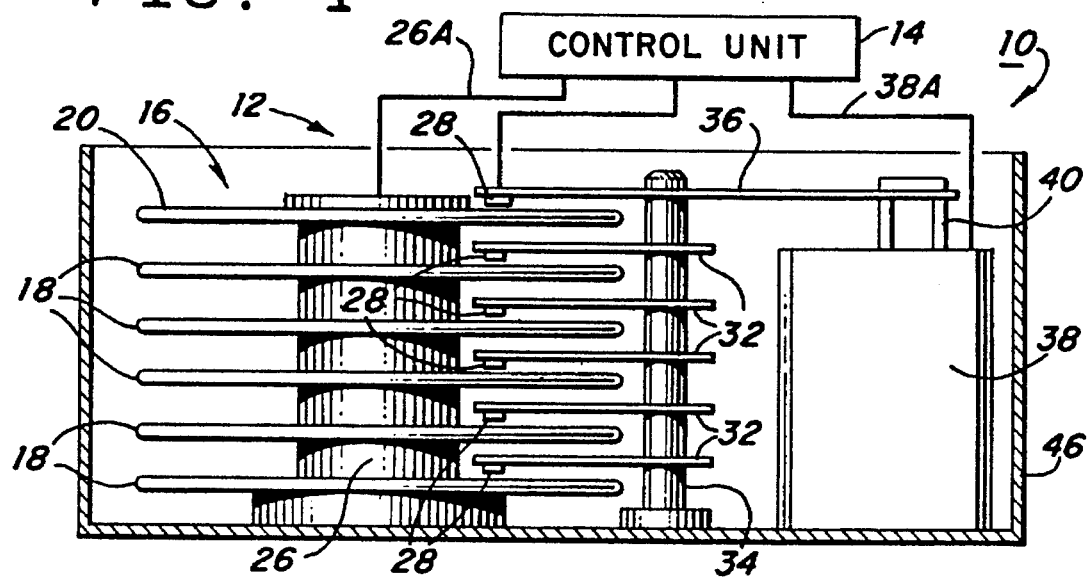
FIG. 1 is a schematic and block diagram of a data storage disk file embodying the present invention.

In FIG. 1 there is shown a partly schematic block diagram of parts of a data storage disk file 10 including a data storage medium generally designated as 12 and a control unit generally designated as 14. In the preferred embodiment of this invention, the data storage medium 12 is embodied in a rigid magnetic disk drive unit 12, although other mechanically moving memory configurations may be used. Unit 12 is illustrated in simplified form sufficient for an understanding of the present invention because the utility of the present invention is not limited to the details of a particular drive unit construction.

Figure 2:
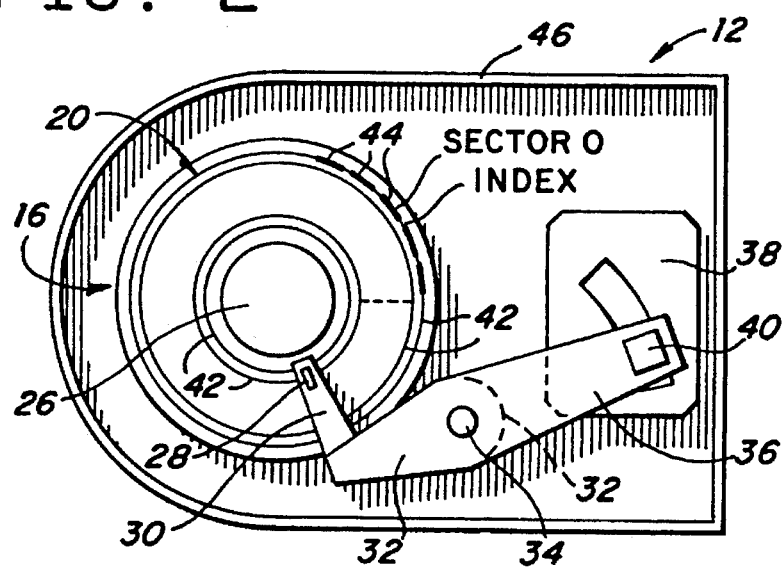
FIG. 2 is a diagram showing the accessing mechanism for a single disk surface of the apparatus of FIG. 1.

Referring now to FIGS. 1 and 2 of the drawings, disk drive unit 12 includes a stack 16 of disks 18 having at least one magnetic surface 20. The disks 18 are mounted in parallel for simultaneous rotation on and by an integrated spindle and motor assembly 26. Data information on each disk 18 are read and/or written to by a corresponding transducer head 28 movable across the disk surface 20.

Transducer heads 28 are mounted on flexure springs 30 carried by arms 32 ganged together for simultaneous pivotal movement about a support spindle 34. One of the arms 32 includes an extension 36 driven in a pivotal motion by a head drive motor 38. Although several drive arrangements are commonly used, the motor 38 can include a voice coil motor 40 cooperating with a magnet and core assembly (not seen) operatively controlled for moving the transducer heads 28 in synchronism in a radial direction in order to position the heads in registration with data information tracks or data cylinders 42 to be followed and access particular data sectors 44. Data storage disk file 10 is a modular unit including a housing 46. The various components of the disk file 10 are controlled in operation by signals generated by control unit 14 such as motor control signals on line 26A and position control signals on line 38A.

Numerous data information tracks 42, each at a specific radial location, are arrayed in a concentric pattern in the magnetic medium of each disk surface 20 of data disks 18. A data cylinder includes a set of corresponding data information tracks 42 for the data surfaces 20 in the data storage disk file 10. Data information tracks 42 include a plurality of segments or data sectors 44, each containing a predefined size of individual groups of data records which are saved for later retrieval and updates. The data information tracks 42 are disposed at predetermined positions relative to a servo reference index. In FIG. 2 one sector 44 is illustrated as SECTOR 0 with a fixed index or mark INDEX for properly locating the first data sector. The location of each next sector 44 is identified by a sector identification (SID) pulse read by transducer heads 28 from surfaces 20.

Figure 3:
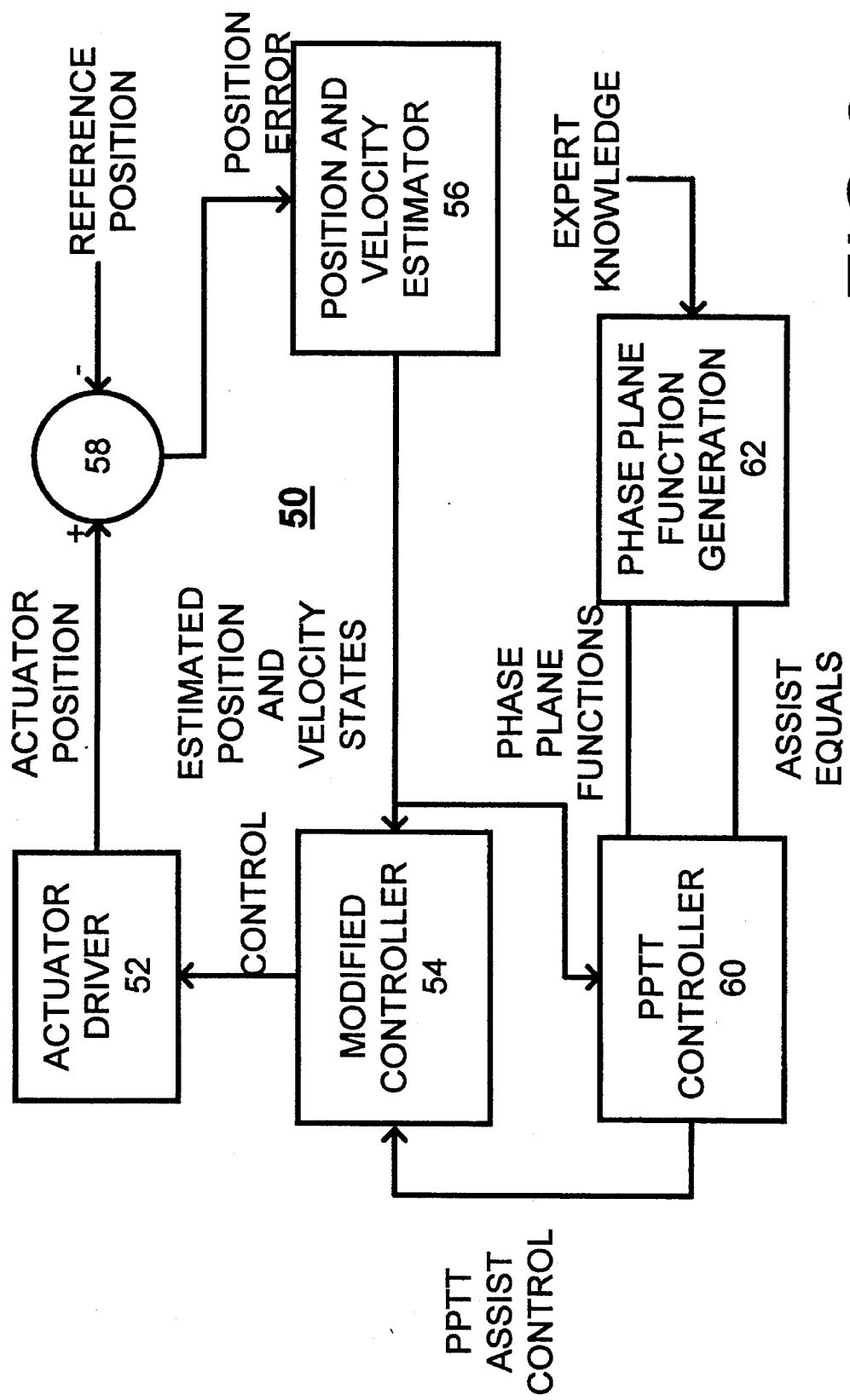
FIG. 3 is a block diagram representation illustrating apparatus for carrying out the phase plane trajectory trough method according to the present invention in the data storage disk file of FIG. 1.

Referring to FIG. 3, there is shown a circuit diagram illustrating phase plane trajectory trough (PPTT) apparatus generally designated by the reference numeral 50 for carrying out the PPTT method for fast settling of a data transducer 28. As shown in FIG. 3, the invention features the use of a phase plane trajectory trough (PPTT) function to assist the traditional PID-type digital control system.

PPTT apparatus 50 includes an actuator driver 52 operatively controlled by a modified controller 54. An estimator 56 receiving a position error signal (PES) from a summation block 58 provides estimated position and velocity states input to both the modified controller 54 and a PPTT controller 60. PPTT controller 60 provides a control signal to the modified controller 54 indicated at a line labelled PPTT ASSIST CONTROL. Modified controller 54 provides an adjusted gain control signal to the actuator driver 52 at each sample time responsive to the PPTT assist control signal. PPTT controller 60 implements a PPTT assist function based on several inputs, including position and velocity state information from the estimator 56, and Phase Plane Functions and Assist Equations from a phase plane function generation block 62. The Phase Plane Functions and Assist Equations are derived and calculated from prior experience with a given control system for disk file 10 so that a desirable arrival trajectory is maintained as the actuator approaches the desired location during an access operation. The PPTT controller 60 uses these inputs to generate the PPTT assist control output that is used in conjunction with the traditional control output generated within the modified controller 54 to form the final control signal for the actuator driver 52. In the digital control system 50 the PPTT controller 60 computes and updates its control action at each sample time in the same way that the modified controller 54 performs its updates.

The settle process in disk file 10 begins when the seek operation has moved the actuator so that a predetermined distance remains, such as 1.0 tracks to move to the selected track. At this point the seek algorithm hands over the control to the settle algorithm, which must then control the actuator to the desired position before handing over control to a track follow algorithm. Due to the many causes for settle variability, the actuator velocity at the hand-over point is not consistent and can cause a wide range of settle responses, many of which are undesirable.

Figure 4:
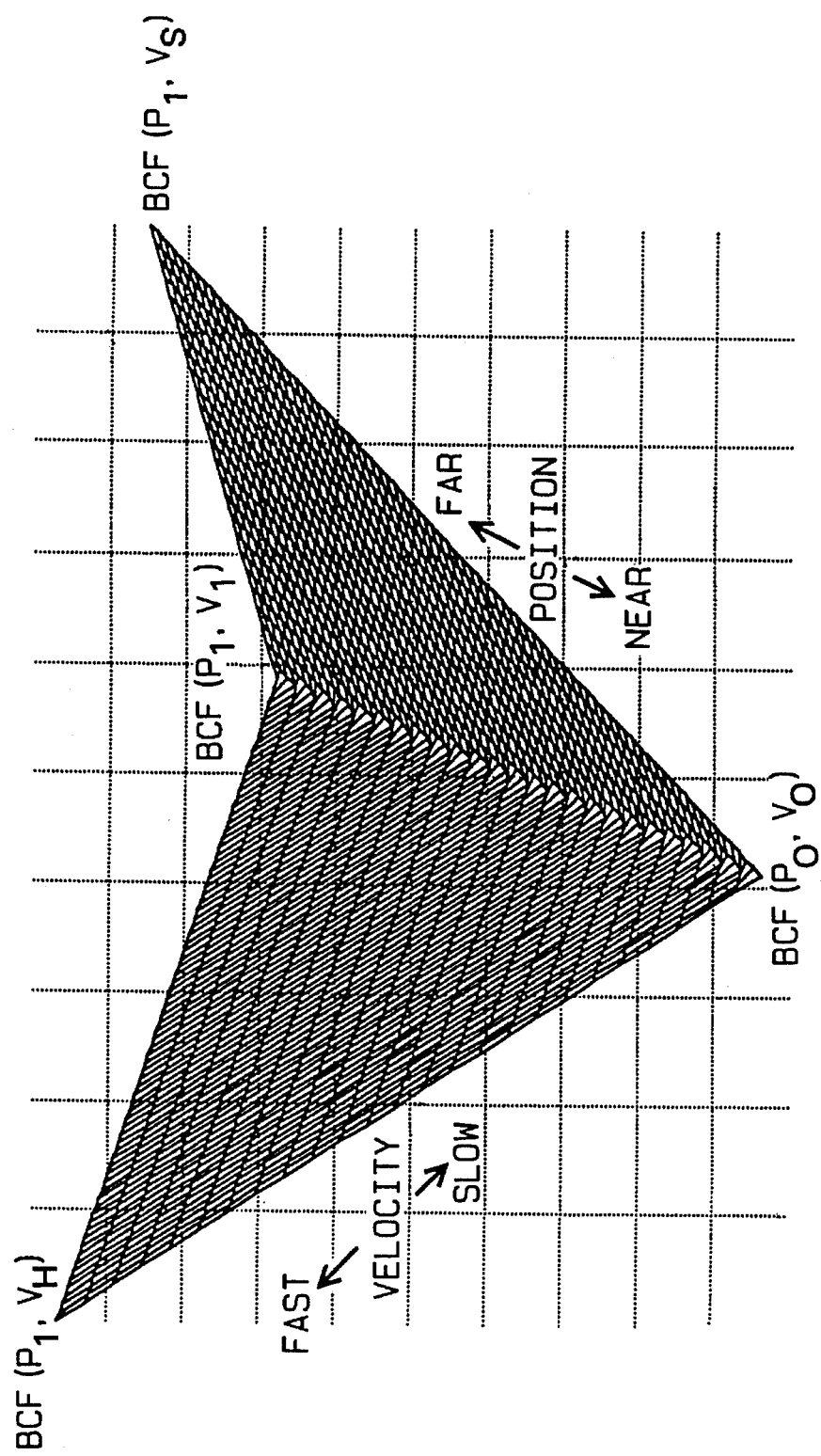
FIG. 4 is a graph illustrating a phase plane trajectory trough function representing position and velocity states for the disk file of FIG. 1 according to the present invention.

Referring to FIG. 4, the phase plane trajectory trough function representation for a disk file 10 is shown. The basic design of the PPTT control apparatus 50 is based upon modifying the control gains for the position and velocity parameters of the control system during the settle operation. The control gains are modified based upon the value of the PPTT function, which is a function of the values of the position and velocity states of the control system. The PPTT function forms a trough, where the minimum points of the trough represent the desired arrival trajectory, as shown in FIG. 4. The phase plane functions are determined initially from analysis and experimentation which develops into expert knowledge of how the system behaves. One or more phase plane functions can be derived for a given system to handle a wide range of control situations. FIG. 4 provides an example aimed at providing better actuator settle response for two situations. The first situation is for a stalled arrival where the velocity is abnormally low with respect to the distance to go to the target. The right half of the trough in FIG. 4 represents the base correction factor (BCF) for the stalled arrival to be applied to the control system gains for a given parametric location in the phase plane. The second situation is for a hot arrival where the velocity is abnormally high with respect to the distance to go to the target or selected track. The left half of the trough in FIG. 4 represents the base correction factor for the hot arrival to be applied to the control system gains for a given parametric location in the phase plane.

During the arrival stage of an access operation, the position and velocity states are monitored by the PPTT controller 60, and are used with the PPTT function generation block 62 to determine the base value of any modification to the gains provided by controller 54. When the position and velocity states track the minimum of the trough corresponding to an arrival following the desirable trajectory, then no modification to the control signal gains is provided by controller 54. However, if either or both the position and velocity states are outside of the desired trajectory, then the PPTT function generates a BCF value for use in modifying the controller 54 gains. This BCF value is applied to the Assist Equations to determine the amount of modification to the controller gains, based on the relationship of the position and velocity states the minimum of the trajectory trough. The effect of the PPTT Functions and Assist Equations is to drive the position and velocity states to follow the minimum of the trough.

FIG. 4 only depicts one of the simpler versions of a number of possible designs for the trajectory trough. For example, some troughs may have an extended minimum region, where the position and velocity states are allowed to vary slightly from the desired trajectory without generating a modification value, while others may have an extended minimum region that tapers to a narrower minimum region as the desired arrival position is approached. Still others may have curve functions built into the trough, or combinations of curve functions with extended minimum regions and taper. Also, for control systems that exhibit a wide range of initial conditions at the seek-to-settle hand-over point, the Phase Plane Functions and Assist Equations can be modified at the start of the settle process based upon these initial conditions. These modifications would take the form of varying the slopes of the walls of the trough by altering the Phase Plane Functions, and/or varying the strengths or the ratio of the strengths of the individual Controller gain modification terms in the Assist Equations.

The control assist equations for the example shown in FIG. 4 are defined as:

$$K1 = K1 + weight_1 \cdot BCF \cdot K1$$

$$K2 = K2 + weight_2 \cdot BCF \cdot K2$$

where K1 is the position gain constant; K2 is the velocity gain constant; $weight_1$ weighting factor (for the given situation); $weight_2$ is the velocity weighting factor (for the given situation); and BCF is the base correction factor for the current parametric location in the phase plane. Note that different phase plane functions and weighting factors can be used based on the initial conditions of the system at the seek-to-settle transition point.

The derivation of the phase plane functions of the PPTT can be performed for the example shown in FIG. 4 by using matrix algebra. The two planes shown in FIG. 4 can be defined as:

$$BCF_s = Position \cdot P_s + velocity \cdot V_s + C_s \text{(STALLED ARRIVAL SITUATION)}$$

$$BCF_h = Position \cdot P_h + velocity \cdot V_h + C_h \text{(HOT ARRIVAL SITUATION)}$$

where $BCF_s$ is the base correction factor from the PPTT for the stalled arrival case; $BCF_h$ is the base correction factor for the PPTT for the hot arrival case; $P_s$ is the position coefficient for the stalled arrival equation; $P_h$ is the position coefficient for the hot arrival equation; $V_s$ is the velocity coefficient for the stalled arrival equation; $V_h$ is the velocity coefficient for the hot arrival equation; $C_s$ is the constant coefficient for the stalled arrival equation and $C_h$ is the constant coefficient for the hot arrival equation.

Matrix algebra can be used to solve for the coefficients of the above equations by selecting three points that are known to be solutions that lie on the plane.

Referring to FIG. 4 for the stalled arrival situation, matrix equations are defined as:

$$\begin{bmatrix} BCF_s(P_o,V_o) \\ BCF_s(P_1,V_1) \\ BCF_s(P_1,V_s) \end{bmatrix} = \begin{bmatrix} P_o & V_o & 1 \\ P_1 & V_1 & 1 \\ P_1 & V_s & 1 \end{bmatrix} \begin{bmatrix} P_s \\ V_s \\ C_s \end{bmatrix}$$

$$\begin{bmatrix} P_s \\ V_s \\ C_s \end{bmatrix} = \begin{bmatrix} P_0 & V_0 & 1 \\ P_1 & V_1 & 1 \\ P_1 & V_s & 1 \end{bmatrix}^{-1} \begin{bmatrix} BCF_s(P_o,V_o) \\ BCF_s(P_1,V_1) \\ BCF_s(P_1,V_s) \end{bmatrix}$$

In a similar manner for the hot arrival situation, matrix equations are defined as:

$$\begin{bmatrix} P_h \\ V_h \\ C_h \end{bmatrix} = \begin{bmatrix} P_0 & V_0 & 1 \\ P_1 & V_1 & 1 \\ P_1 & V_h & 1 \end{bmatrix}^{-1} \begin{bmatrix} BCF_h(P_o,V_o) \\ BCF_h(P_1,V_1) \\ BCF_h(P_1,V_s) \end{bmatrix}$$

Figure 5:
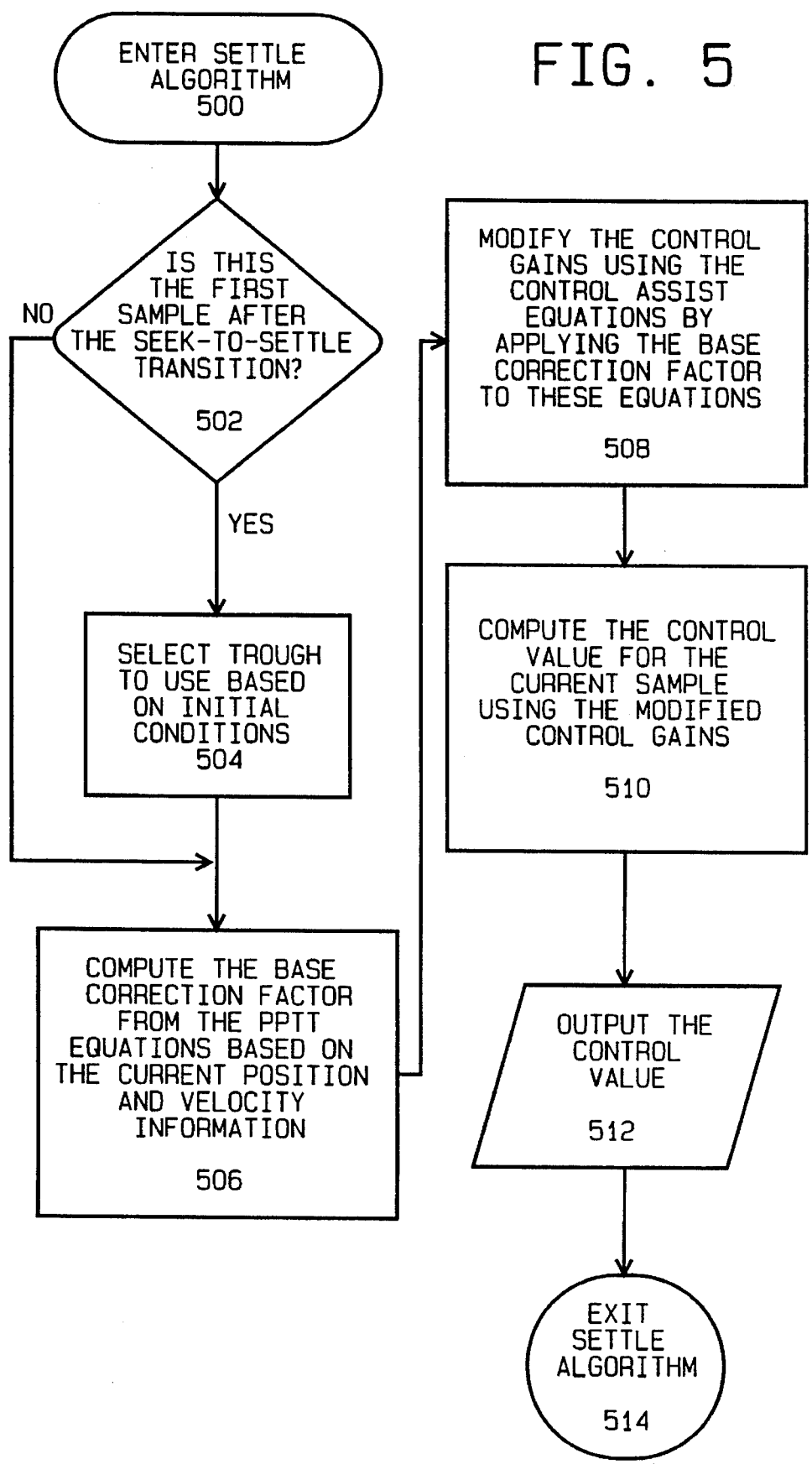
FIG. 5 is a flow chart illustrating sequential steps of the phase plane trajectory trough method of the invention.

FIG. 5 provides a general flowchart of an actuator settle algorithm that implements the PPTT method. The sequential operations begin with entering the actuator settle algorithm as indicated at a block 500. First it is determined if this is the first sample after a seek-to-settle transition as indicated at a decision block 502. When the sample is the first sample after a seek-to-settle transition, then a trough is selected based upon initial conditions as indicated at a block 504. The PPTT method generally handles a wide range of initial conditions. However, for extreme cases, alternative troughs are defined and dynamically selected at the seek-to-settle transition point. Otherwise when the sample is not the first sample after a seek-to-settle transition, then the base correction factor is computed from the PPTT equations based upon the current position and velocity information as indicated at a block 506. Then the control gains are modified using the control assist equations by applying the base correction factor to these equations as indicated at a block 508. Next a control value is computed for the current sample using the modified control gains as indicated at a block 510. The calculated control value is applied to the actuator driver 52 as indicated at a block 512 and the settle algorithm is exited as indicated at a block 514.

Assuming the seek-to-settle transition point has been detected, the sequential steps of blocks 506, 508, 510, 512 and 514 are repeated once each servo sample time until settle is completed with the actuator positioned over the selected track.

Figure 6:
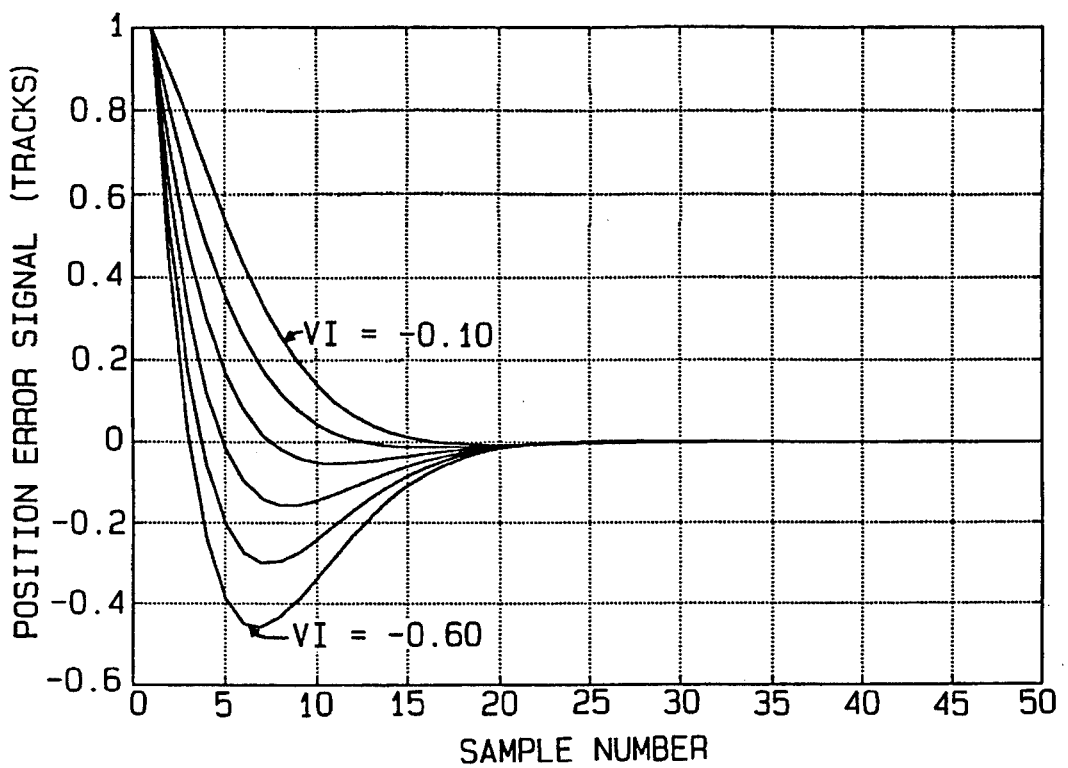
FIG. 6 is a graph illustrating settle responses for a plurality of initial conditions with a conventional proportional-integral-derivative (PID) controller.
Figure 7:
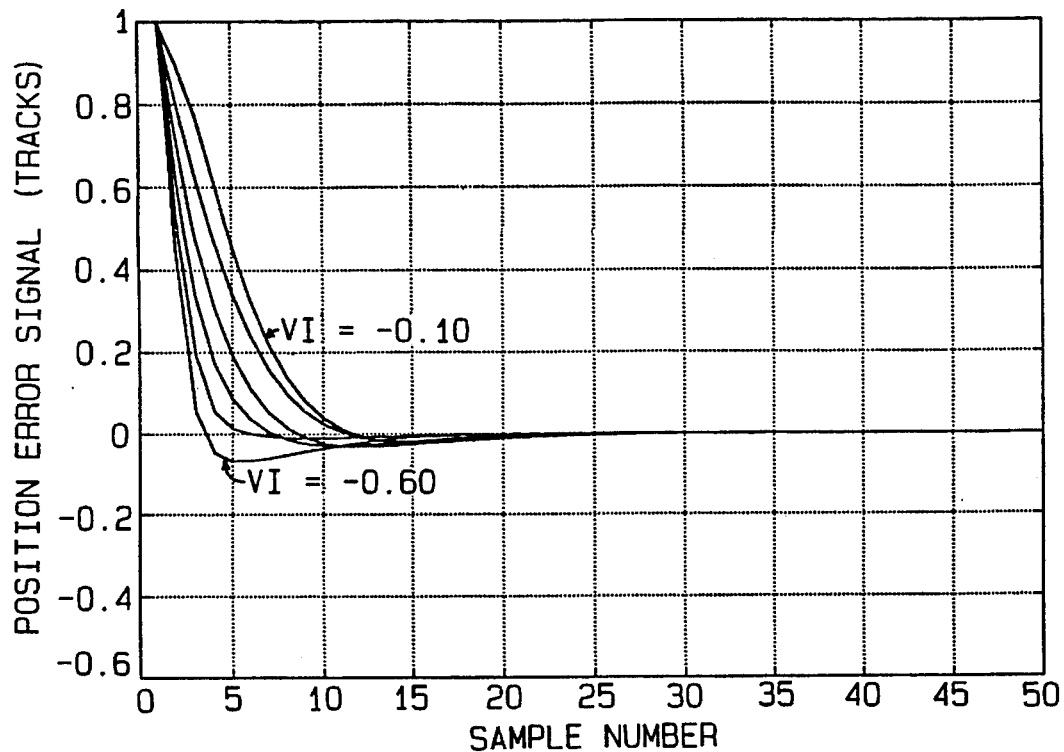
FIG. 7 is a graph similar to FIG. 6 illustrating settle responses for the plurality of initial conditions with a phase plane trajectory trough (PPTT) modified controller according to the present invention.

Variations in settle performance for different initial conditions are shown in FIG. 6 typical for traditional PID-type control systems. An improved consistent family of curves is shown in FIG. 7 with PPTT Settle Assist. In FIGS. 6 and 7, VI represents initial velocity in tracks per sample with a step size of 0.10 tracks/sample between the curves. In comparing FIGS. 6 and 7, it can be seen how the addition of a PPTT control apparatus 50 greatly improves the overall settle response.

It should be understood that the PPTT control assist method of the invention is not restricted to the settle process in a DASD file. It may also be used in the track seek process to eliminate overshoot and undershoot of the seek velocity profile, and in the track following process to provide for tighter positioning control. By applying PPTT techniques, a much broader range of input conditions can be handled. Improvements in the settle response can be seen with even relatively simple Phase Plane Trajectory Trough Functions that do not consume a significant amount of microprocessor memory and time as compared to other techniques.

While the invention has been described with reference to details of the illustrated embodiments, these details are not intended to limit the scope of the invention as defined in the appended claims.

We claim:

1. Apparatus for positioning a transducer means over a selected track on a disk surface in a disk file comprising:

actuator means for moving the transducer means from one track location to another track location;

controller means coupled to said actuator means for applying a gain control signal to control movement of said actuator means;

phase plane function generation means for defining a phase plane trajectory trough (PPTT) function;

estimator means coupled to said actuator means for estimating velocity and position states of said actuator means;

phase plane trajectory trough (PPTT) controller means responsive to said estimator means for comparing an estimated velocity and position state with said phase plane trajectory trough PPTT) function for generating a base correction factor; and said controller means being responsive to both said estimator means and said phase plane trajectory trough (PPTT) controller means for modifying said gain control signal.

2. Apparatus for positioning a transducer head as recited in claim 1 wherein said phase plane function generation means for defining said phase plane trajectory trough (PPTT) function is represented by:

$BCF_s = \text{Position} \cdot P_s + \text{velocity} \cdot V_s + C_s$ $BCF_h = \text{Position} \cdot P_h + \text{velocity} \cdot V_h + C_h$ where $BCF_s$ is the base correction factor from the PPTT for a stalled arrival case; $BCF_h$ is the base correction factor for the PPTT for a hot arrival case; $P_s$ is the position coefficient for the stalled equation; $P_h$ is the position coefficient for the hot equation; $V_s$ is the velocity coefficient for the stalled equation; $V_h$ is the velocity coefficient for the hot equation; $C_s$ is the constant coefficient for the stalled equation and $C_h$ is the constant coefficient for the hot equation.

3. Apparatus for positioning a transducer head as recited in claim 1 wherein said phase plane trajectory trough (PPTT) controller means is responsive to control assist equations defined by:

$K1 = K1 + \text{weight}_1 \cdot BCF \cdot K1$ and $K2 = K2 + \text{weight}_2 \cdot BCF \cdot K2;$ where K1 is the position gain constant; K2 is the velocity gain constant; $\text{weight}_1$ is the position weighting factor for a given situation; $\text{weight}_2$ is the velocity weighting factor for the given situation; and BCF is the base correction factor for the current parametric location in the phase plane trajectory trough (PPTT) function.

4. Apparatus for positioning a transducer head as recited in claim 1 wherein said controller means coupled to said actuator means for applying a gain control signal to control movement of said means includes a proportional-integral-derivative (PID) controller.

5. Apparatus for positioning a transducer head as recited in claim 1 further includes means for generating a position error signal and wherein said estimator means for estimating velocity and position states of said actuator means is responsive to said position error signal during a settle operation at the conclusion of a seek to the selected track.

6. A phase plane trajectory trough method for positioning a transducer means over a selected track on a disk surface in a disk file including actuator means for moving the transducer means from one track location to another track location; said method comprising the steps of:

applying a gain control signal to the actuator means to control movement of said actuator means;

defining a phase plane trajectory trough (PPTT) function for the disk file;

estimating velocity and position states of said actuator means at a seek-to-settle transition in the access to the selected track;

comparing the estimated velocity and position states with said phase plane trajectory trough (PPTT) function for generating a base correction factor; and modifying said gain control signal responsive to both the estimated velocity and position states and the generated base correction factor.

7. A phase plane trajectory trough method as recited in claim 6 wherein said step defining said phase plane trajectory trough function for the disk file includes the steps of:

monitoring access operations of the disk file and calculating desirable arrival trajectory values based on a plurality of monitored access operations.

8. A direct access storage device comprising:

a housing;

at least one disk mounted in said housing for rotation about an axis and having at least one disk surface including a plurality of data tracks for storing data;

transducer means mounted for movement across said disk surface for reading and writing data to said data tracks;

actuator means coupled to said transducer means for moving said transducer means from one track location to another track location;

controller means coupled to said actuator means for applying a gain control signal to control movement of said actuator means;

phase plane function generation means for defining a phase plane trajectory trough (PPTT) function; estimator means for estimating velocity and position states of said actuator means;

phase plane trajectory trough (PPTT) controller means responsive to said estimator means for comparing an estimated velocity and position state with said phase plane trajectory trough function for generating a base correction factor; and said controller means being responsive to both said estimator means and said phase plane trajectory trough (PPTT) controller means for modifying said gain control signal.

* * * * *